Feb. 10, 1970     C. CAREGNATO     3,494,641
QUICK CLAW-AND-FLANGE COUPLING FOR PIPES

Filed Aug. 30, 1967     3 Sheets-Sheet 1

INVENTOR
Cesare Caregnato
BY Edwin E. Greigg
ATTORNEY

United States Patent Office 3,494,641
Patented Feb. 10, 1970

3,494,641
QUICK CLAW-AND-FLANGE COUPLING FOR PIPES
Cesare Caregnato, 36/4 Via Arrigo Boito, Genova-Pegli, Italy
Filed Aug. 30, 1967, Ser. No. 664,469
Int. Cl. F16l 37/20
U.S. Cl. 285—311                      2 Claims

ABSTRACT OF THE DISCLOSURE

A quick coupling for pipes comprising a first pipe section provided with pairs of hinged claws controlled by means of hand levers acting upon operating crank pins, and a second pipe section ending with a flange adapted to be hooked by said claws of the first pipe section and pressed against a packing ring inserted between said pipe sections.

---

This invention relates to couplings for pipe sections and particularly for quick claw-and-flange couplings for readily connecting and disconnecting particularly, but not exclusively, large pipe sections, such as those employed for fluid-tightly joining large hoses or pipe sections from aboard ships to fixed pipe sections ashore.

According to the invention, the said coupling comprises a first pipe section provided with pairs of hinged claws controlled by means of hand levers acting upon operating crank pins and ending with a first flange, and a second pipe section ending with a second flange adapted to be hooked by said claws of the first pipe section and pressed by being drawn by said claws against a packing ring inserted between said first and second flanges.

According to a further characteristic feature of the invention, the said claw-operating crank pins, are urged from a claw-disengaging position, to a claw-engaging and coupling tightening position, by passing past a dead-center plane, which is practically the plane passing through the axis of the shaft about which the crank pins rotate.

Further features and advantages of the present invention will become apparent from the following specification of two embodiments of the invention, shown by way of non-limiting example in the accompanying drawings, in which.

Figure 1:
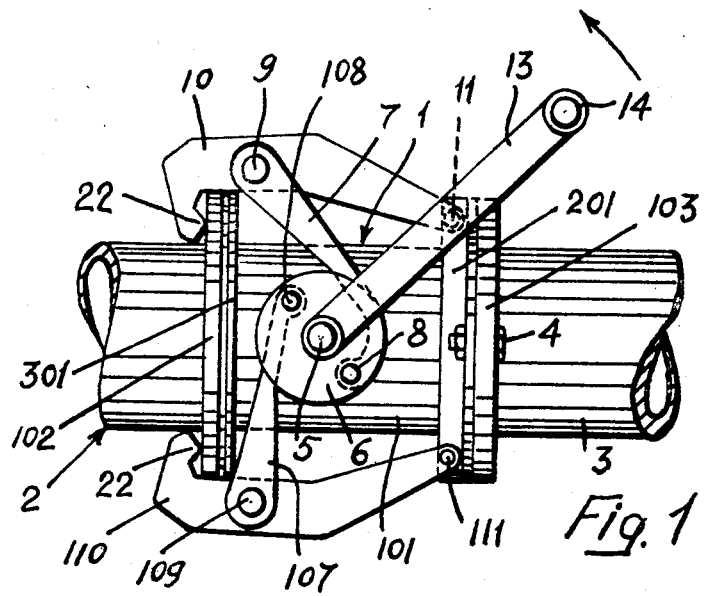
FIGURES 1 and 2 are respectively a side view and a top plan view of the adjoining ends of two pipe sections joined together by means of a quick claw-and-flange coupling according to the invention.
Figure 2:
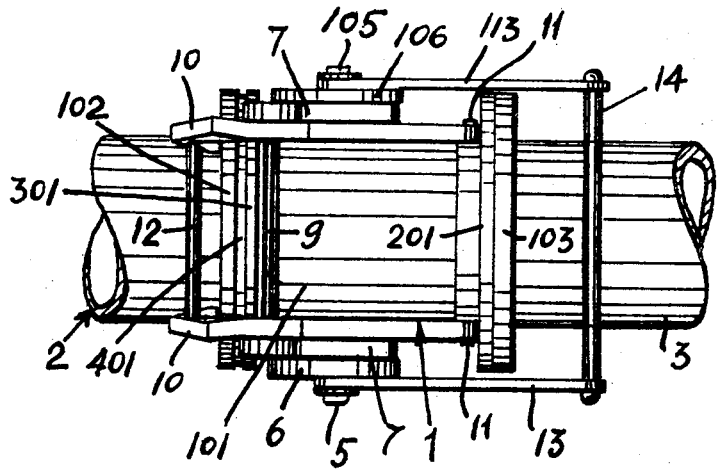
Figure 3:
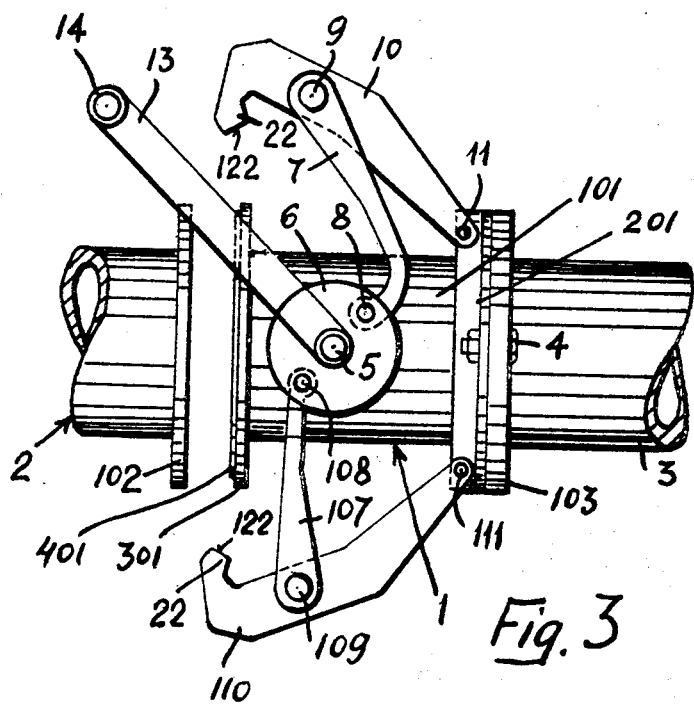
FIGURE 3 is a side view of the same pipe ends with the coupling in disengaging position.

With reference to FIGURES 1 to 3 of the drawings, the pipe coupling comprises a first tubular section 1, provided with claws 10–110, and a second tubular section 2, provided with flange 102 adapted to be hooked by said claws 10–110. In the embodiment as shown, the claws 10–110 are mounted on a member 1 comprising a short tubular section 101 provided at both ends with annular flanges 201, 301. Flange 301 is provided at its front end with an annular groove in which a packing ring 401 is seated. Flange 201 is provided with angularly spaced through bores, and is bolted by means of bolts 4 to a corresponding annular flange 103 formed at one end of pipe 3.

On diametrically opposite positions of coupling member 1, pivots 5–105 are fastened co-axially and project for a short distance radially outwardly of members 1.

On each of said outwardly projecting ends of said pivots 5, 105, crank-discs 6, 106 are rotatably mounted from each of which project a pair of crank pins 8–108 to which a pair of shaped links 7 and 107 are hinged by one of their ends, while the other ends of said link pairs are connected together by means of a rod 9, respectively 109, extending through a bore formed in an intermediate position of each of a pair of levers 10, 110. Lever 10, 110 are pivoted at one end to flange 201 by means of pivot pins 11, are hinged in an intermediate position 9–109 to the links 7–107 and at their other ends they are provided with hook-shaped claws, so as to be able to hook an edge of flange 102 of pipe section 2.

The said hook-shaped claws 22 of levers 10, 110 are bevelled as shown at 122.

The lever pairs 10–10, and 110–110 are connected together at their front ends by means of a tie rod 12, respectively 112.

A pair of control levers 13, 113 are fastened, for example, by welding, radially onto discs 6, 106, and their free ends project from said discs by such a distance as not to interfere with the operation of the described joint, and are connected together by means of a rod 14, acting as a control hand grip in the operation of the described joint.

The operation of the just described coupling is as follows. With a joint section in the position shown in FIGURE 1, by exerting a pull on the hand grip 14 in the direction of the arrow, the discs will be rotated counterclockwise, and their crank pins 8–108 by rotating beyond the dead-center plane passing through the axis of the tubular sections, will force links 7–107 to swing the hook-shaped claws 22 of levers 10–110 clear of flange 102 of pipe section 2 as shown in FIGURE 3.

For again coupling the pipe sections 1 and 2 together, it is sufficient to bring flange 102 into contact with flange 301 with the joint sections 2 and 1 in substantially axially alignment. Thereafter, the hand grip 14 is pulled back in clockwise direction in FIGURE 1, thus causing the hook-shaped ends of levers 10, 110 to again urge flange 102 toward flange 301 by clamping the interposed packing ring 401 therebetween.

Figure 4:
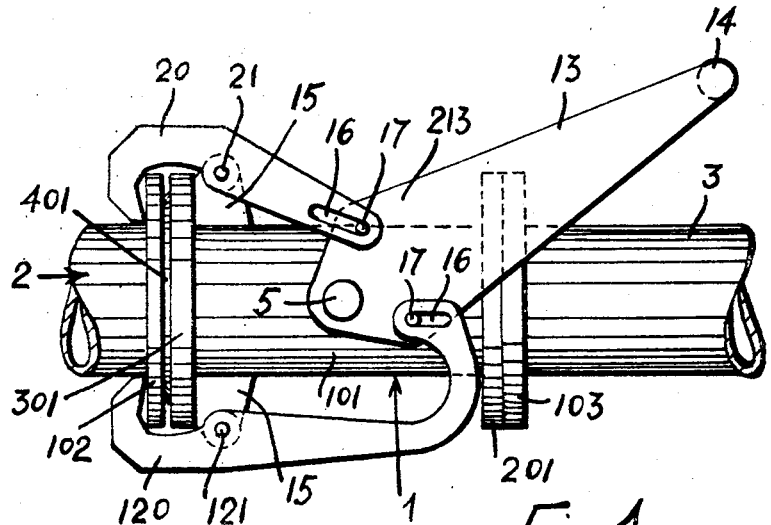
FIGURE 4 is a side view of two pipe sections coupled by means of a second embodiment of a coupling according to the invention.
Figure 5:
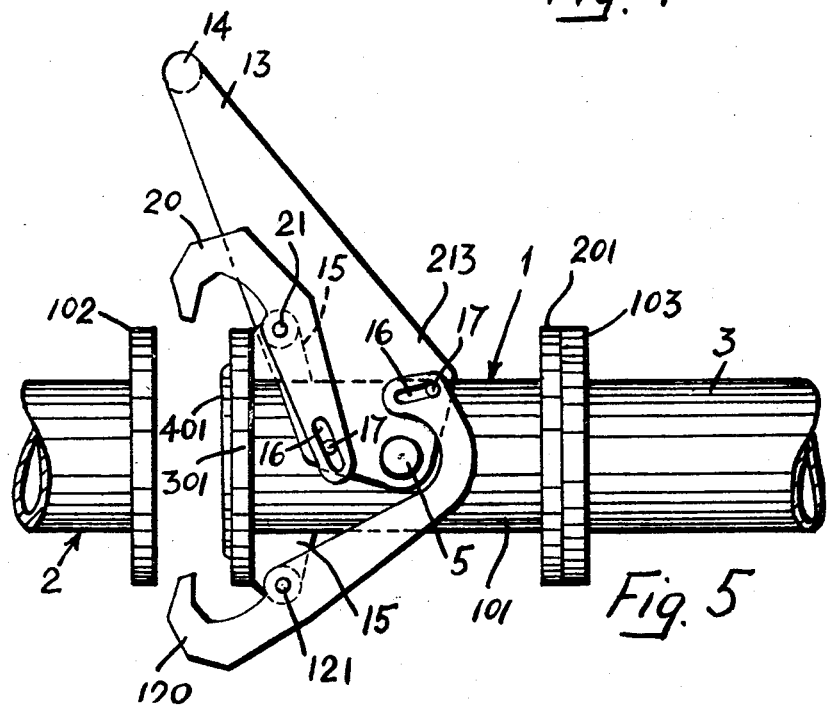
FIGURE 5 is a side view of the same pipe sections as in FIGURE 4, disengaged.

In FIGURES 4 and 5 of the drawings, a second embodiment of the invention is shown, according to which the control levers 20, 120 are fulcrumed in an intermediate position at 21, 121 to the lugs 15 projecting from joint 1. The rear end of each of said levers 20, 220 is slotted as shown by 16 and is in engagement with a pin 17 carried by the enlarged end section 213 of control levers 13. The levers 13 are fulcrumed at their enlarged ends to pivots 5, and the pins 17 are secured to said lever ends 213 eccentrically, with respect to pivot 5, so as to act as crank pins. The levers 13 are connected together by means of a connecting handgrip 14.

The operation of the just described joint is very similar to the operation of the previously described embodiment of FIGURES 1 to 3, and need not to be further described.

From the foregoing, it is apparent that a very efficient joint has been devised for joining two pipe sections together, in a quick and reliable manner, providing a fluid tight connection between said pipes.

It is to be understood, however, that the invention shall not be limited to the hereinbefore described embodiments of same, but shall include all constructions which may be deemed as based on the basic idea of the invention, as fully set out above.

I claim:
1. A pipe coupling comprising: a first pipe section having a terminal flange portion and a pair of hook-shaped claws of two different lengths including slotted end portions pivotally and slidably connected to means extending from an enlarged portion of a fulcrumable lever having a pivot point on the first pipe section, said hook-shaped claws also pivotal about lugs positioned between the terminal flange portion of the first pipe section and the pivot point of the lever, a second pipe section having a terminal flange to be secured to said first pipe section, said lever being operable to move the hook-shaped claws into engagement with the terminal flange portion of the second section to lock the pipe sections into abutting engagement as well as out of engagement therewith to permit separation of said pipe sections.

2. A pipe coupling as claimed in claim 1, in which the hook-shaped claws are disposed eccentrically of the pivot point of said lever.

References Cited

UNITED STATES PATENTS

| 1,370,790 | 3/1921 | De Mund | 285—308 X |
| 1,910,706 | 5/1933 | Malzard | 285—320 X |
| 2,370,354 | 2/1945 | Hurst | 285—311 |
| 2,691,201 | 10/1954 | Matthews | 285—420 X |
| 2,703,723 | 3/1955 | Hess | 285—311 X |
| 2,830,830 | 4/1958 | Jacobs et al. | 285—320 X |

FOREIGN PATENTS 1,216,769  5/1966  Germany.

DAVID J. WILLIAMOWSKY, Primary Examiner

D. W. AROLA, Assistant Examiner

U.S. Cl. X.R.

285—320, 364